(12) United States Patent
Chang

(10) Patent No.: US 8,872,618 B2
(45) Date of Patent: Oct. 28, 2014

(54) UNLOCKING METHOD FOR ELECTRONIC DEVICE

(76) Inventor: Nai-Chien Chang, New Taipei (TW)

( * ) Notice: Subject to any disclaimer, the term of this patent is extended or adjusted under 35 U.S.C. 154(b) by 106 days.

(21) Appl. No.: 13/442,433

(22) Filed: Apr. 9, 2012

(65) Prior Publication Data

US 2013/0265135 A1    Oct. 10, 2013

(51) Int. Cl.
*G05B 19/00*    (2006.01)

(52) U.S. Cl.
USPC ............................ 340/5.51; 345/173; 455/565

(58) Field of Classification Search
USPC .................. 345/173; 455/566, 565; 340/5, 51
See application file for complete search history.

(56) References Cited

U.S. PATENT DOCUMENTS

| 7,479,949 B2* | 1/2009 | Jobs et al. ...................... 345/173 |
| 2007/0161410 A1* | 7/2007 | Huang et al. .................. 455/565 |

* cited by examiner

*Primary Examiner* — Steven Lim
*Assistant Examiner* — Kaleria Knox
(74) *Attorney, Agent, or Firm* — Chun-Ming Shih; HDLS IPR Services

(57) ABSTRACT

An unlocking method for an electronic device which has a plurality of light-sensors thereon and stores an application program therein first executes the application program when the electronic device works in a locking mode. When the application program is executed, the method continually computes a covering order of user's covering action performed on the light-sensors via the application program. Therefore, the method controls the electronic device to switch from the locking mode to an unlocking mode when the covering order of the covering action is matched with an unlocking condition.

10 Claims, 6 Drawing Sheets

UNLOCKING METHOD FOR ELECTRONIC DEVICE

BACKGROUND OF THE INVENTION

1. Field of the Invention

The invention related to an electronic device, and in particularly to an unlocking method for the electronic device to switch the electronic device from a locking mode to an unlocking mode.

2. Description of Prior Art

Following the development of semiconductor industry, the function of electronic devices becomes stronger each day. Because of the stronger function and human-based interface, these electronic devices are called intellectual electronic device in the market.

FIG. 1 is a schematic view of a prior art electronic device. The intellectual electronic device 1 (referred to as the electronic device 1 hereinafter) now mainly has a large size touchable display monitor 11, and a number of control buttons 12. User can complete most operations through the touchable display monitor 11, so the electronic device 1 is generally provided with few control buttons 12.

Because of the convenience of the touchable display monitor 11, the normal unlocking method by using the control button 12 is replaced with a new unlocking method by using the touchable display monitor 11. As shown in FIG. 1, the electronic device 1 displays an unlocking bar 111 on the display monitor 11, and the unlocking bar 111 shows an unlocking instructions for user. User can touch the unlocking bar 111 and slide on it toward a certain direction indicated by the unlocking instructions of the unlocking bar 111, and the electronic device 1 can be unlocked successfully.

The electronic device 1 includes a plurality of hardware components therein, some hardware components other than the display monitor 11 and the control button 12 can also be designed to unlock the electronic device 1. However, most of the users used to unlock the intellectual electronic device by using the display monitor 11 (for example, use the unlocking bar 111), it is hard to provide a new unlocking method in market by using another hardware components in the electronic device 1 without changing user's habit of operating.

SUMMARY OF THE INVENTION

The present invention is to provide an unlocking method for an electronic device, and user can use the existent hardware construction thereon to execute unlocking action, so as to switch the electronic device from a locking mode to an unlocking mode.

For achieving the above purpose, the electronic device of the present invention is set a plurality of light-sensors on the surface and stored an application program therein. When the electronic device works in a locking mode and the application program is executed, the application program computes a covering order of user's covering action performed on the light-sensors. Therefore, the electronic device is switched from the locking mode to an unlocking mode when the covering order of the covering action is matched with an unlocking condition.

Most of intellectual electronic devices in the market now build in not only control buttons and touchable monitor, but also at least one light-sensor. The light-sensor can senses the intensity of external light for adjusting the brightness of the monitor, so the convenience of the intellectual electronic device can be raised for user.

The unlocking method of the present invention is implemented by using the light-sensor, not by the common hardware construction such as the control buttons and the touchable monitor on the electronic device, so the present invention brings user freshness without changing original habit of usage. User needs not to learn a new operation way to unlock the electronic device, so the present invention can be easily accepted.

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
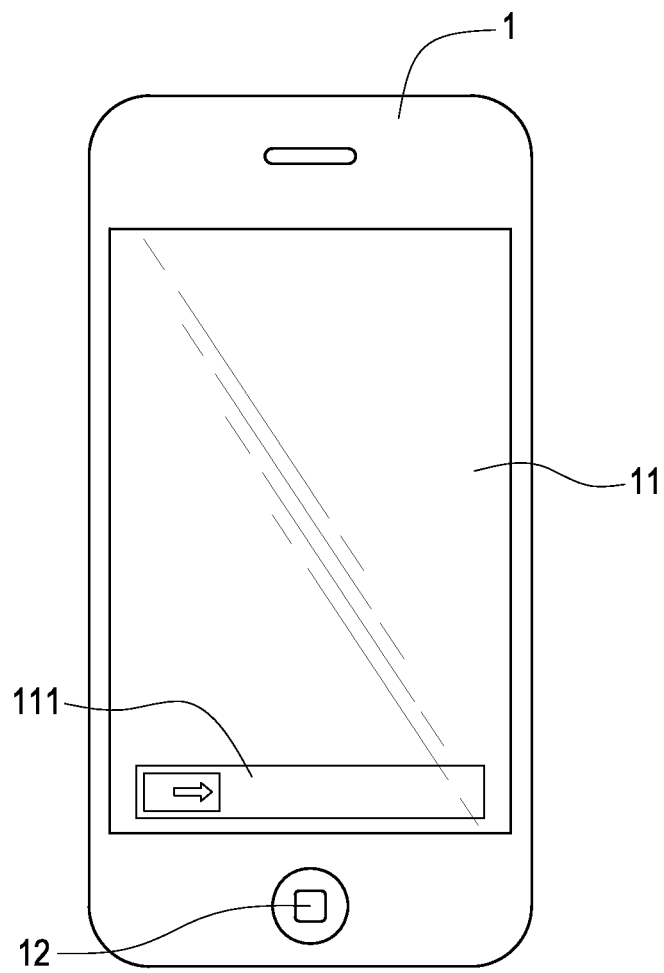
FIG. 1 is a schematic view of a prior art electronic device.
Figure 2:
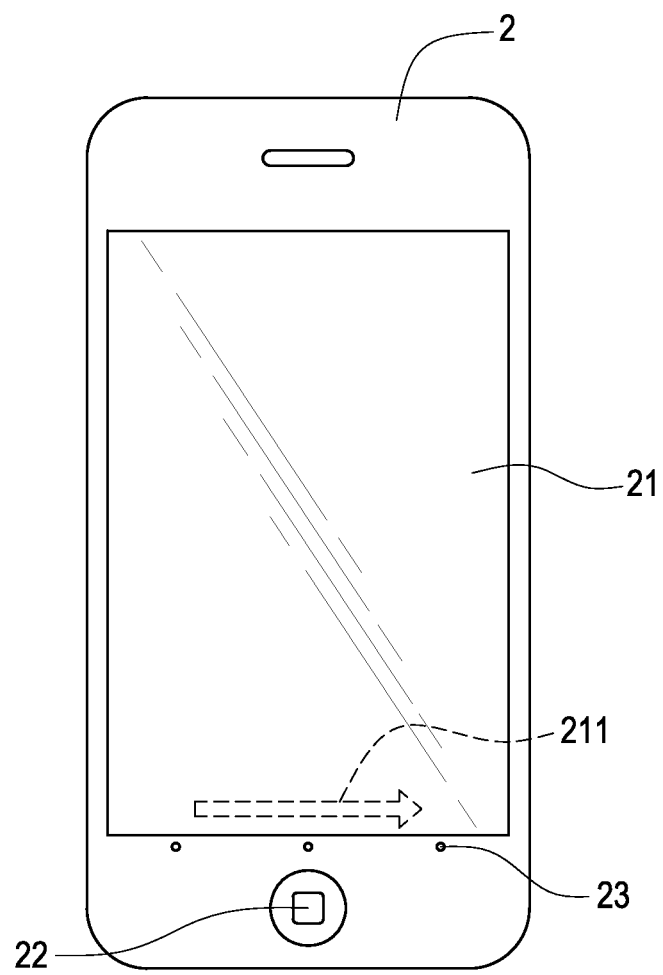
FIG. 2 is a schematic view of a locking mode of one embodiment according to the present invention.
Figure 3:
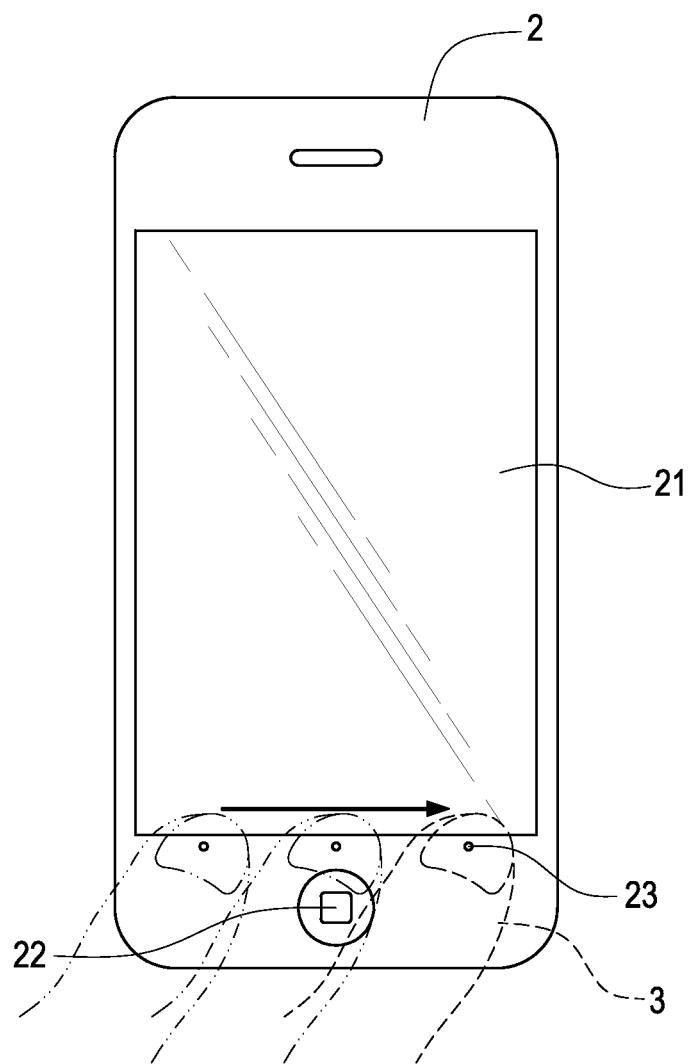
FIG. 3 is a schematic view of an unlocking action of one embodiment according to the present invention.

FIG. 2 is a schematic view of a locking mode of one embodiment according to the present invention, and FIG. 3 is a schematic view of an unlocking action of one embodiment according to the present invention. The present invention discloses an electronic device 2 which has a display monitor 21 and at least one control button 22, and the electronic device 2 further arranges a plurality of light-sensors 23 on the surface. In this embodiment, the light-sensors 23 are arranged in parallel under the display monitor 21, and the amount of the light-sensors 23 can be, for example, three in this embodiment. However, the amount of the light-sensors 23 can be any integer, and the light-sensors 23 can also be arranged in parallel above the display monitor 21, not intended to limit the scope of the present invention.

As shown in FIG. 2, when working in a locking mode 251 (as the locking mode 251 shown in FIG. 4), the electronic device 2 can't be operated by user. When permitting to be unlocked, the electronic device 2 displays an instruction information 211 on the display monitor 21 (as shown in FIG. 2, the instruction information 211 guides user to cover the light-sensors 23 in predetermined order such as from left to right direction).

As shown in FIG. 3, user can use any object, for example, user's finger 3 in this embodiment, to perform an unlocking action according to a direction indicated by the instruction information 211. In this embodiment, the unlocking action is to cover the light-sensors 23 in a certain order. Therefore, the electronic device 2 can be unlocked, and in particularly, the electronic device 2 is switched from a locking mode 251 to an unlocking mode 252 (as the unlocking mode 252 shown in FIG. 4). When working in the unlocking mode 252, the electronic device 2 can be operated by user via the control button 22 or the touchable display monitor 21.

The electronic device 2 in the present invention senses the unlocking action through the light-sensors 23. In this circumstance, user can perform the unlocking action on the electronic device 2 even if the display monitor 21 of the electronic device 2 is not touchable. Therefore, the selection of the hardware constructions for manufacturing the electronic device 2 is more flexible.

Figure 4:
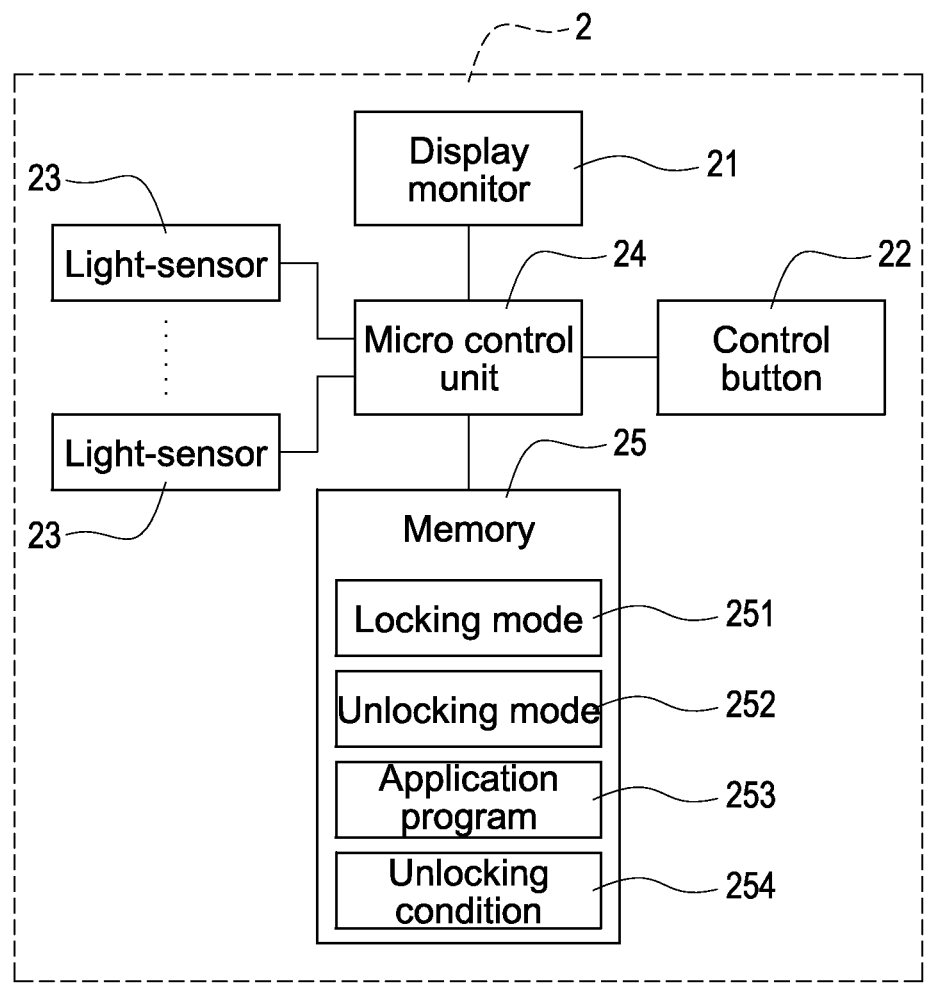
FIG. 4 is a block diagram of an electronic device of one embodiment according to the present invention.

FIG. 4 is a block diagram of an electronic device of one embodiment according to the present invention. The electronic device 2 in this embodiment mainly includes the display monitor 21, the at least one control button 22, the plurality of light-sensors 23, a micro control unit (MCU) 24, and a memory 25, wherein, the locking mode 251 and the unlocking mode 252 mentioned above are stores in the memory 25.

The MCU 24 electrically connects to the display monitor 21, the control buttons 22, the light-sensors 23 and the memory 25. The electronic device 2 performs the locking mode 251 through the MCU 24, and displays the instruction information 211 on the display monitor 21 when it permits to be unlocked. When entering the unlocking mode 252, the electronic device 2 displays a number of icons on the display monitor 21 (now shown), and each icon is corresponding to one software that can be operated by user.

Further, the MCU 24 receives data transmitted by the control button 22 and the light-sensors 23, so as to determine which operation is performed on the electronic device 2 by user, for example, the unlocking action or a normal operating action.

The memory 25 stores the locking mode 251 and the unlocking mode 252, and further stores an application program 253 and an unlocking condition 254. When the light-sensors are activated, the application program 253 computes data sensed by the light-sensors when user performs the unlocking action on the light-sensors, and the sensed data is transmitted and compared with the unlocking condition 254. If the sensed data is matched with the unlocking condition 254, the electronic device 2 is switched from the locking mode 251 to the unlocking mode 252.

Figure 5:
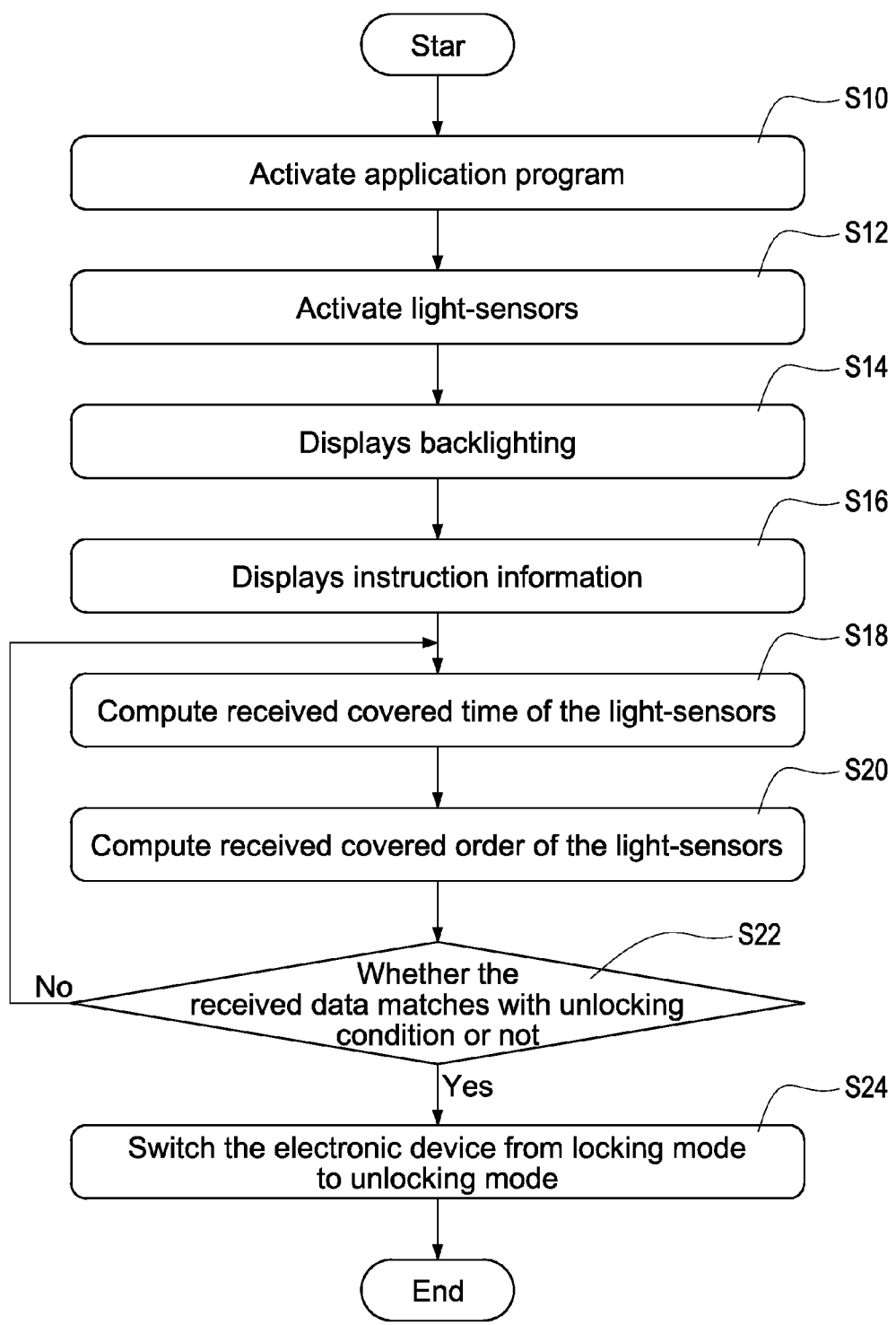
FIG. 5 is a flowchart of an unlocking action of one embodiment according to the present invention.

FIG. 5 is a flowchart of an unlocking action of one embodiment according to the present invention. Firstly, the electronic device 2 works in the locking mode 251, if user wants to unlock the electronic device 2, the application program 253 in the electronic device 2 should be activated (step S10), and the light-sensors 23 on the electronic device 2 should also be activated, too (step S12). Therefore, the electronic device 2 can detect the unlocking action performed by the user via the light-sensors 23, and use the application program 253 to compute whether the unlocking action is matched with the unlocking condition 254 or not.

In particularly, the application program 253 and the light-sensors 23 can be activated simultaneously when the control button 22 is pressed in the step S10 and S12 in this embodiment, and the step S10 and S12 need not execute in certain order. The above description is just a preferred embodiment, not intended to limit the scope of the present invention.

For providing the convenience for user to easily perform the unlocking action, the electronic device 2 displays back-lighting on the display monitor 21 after the step S10 and S12 (step S14). Also, the electronic device 2 displays the instruction information 211 on the display monitor 21 for guiding the user (step S16). In this embodiment, the above four steps S10 to S16 can be executed simultaneously when the control button 22 is pressed, and the four steps need not execute in certain order, not intended to limit the scope of the present invention.

The unlocking method of the present invention detects the unlocking action by determining whether the light-sensors 23 are covered or not. The light-sensor is determined to be covered when it works normally but can't detect any light source.

As mentioned above, the electronic device 2 displays back-lighting on the display monitor 21 after the light-sensors are activated, therefore, before the user performs the covering action, the light-sensors can sense the light source from the backlighting displayed on the display monitor 21.

When performing the unlocking action, user can perform the covering action as shown in FIG. 3, which covers the light-sensors 23 on the surface of the electronic device 2, so as to default the light-sensors 23 in detecting light source. After being covered, the light-sensors 23 transmit covered time and covered order to the MCU 24. Therefore, the MCU 24 executes the application program 253 to computer the received covered time of the light-sensors 23 (step S18), and to computer the received covered order of the light-sensors 23 (step S20).

Finally, the application program 253 determines whether the received data matches with the unlocking condition 254 or not (step S22). If the received data does not match with the unlocking condition 254 in step S22, then back to the step S18 or S20, for re-detecting the unlocking action by the light-sensors 23. Else, if the received data matches with the unlocking condition 254 in step S22, the MCU 24 controls the electronic device 2 to switch from the locking mode 251 to the unlocking mode 252 (step S24).

The application program 253 mainly compares the covered time and covered order of the light-sensors 23 with the unlocking condition 254, so as to determine whether the unlocking action performed by user matches with the unlocking condition 254 or not. In particularly, the unlocking condition 254 is set by user himself, so it can be set to include only one of the covered time and the covered order, also, is can be set to include both of them. If the unlocking condition 254 only includes one of the covered order and the covered time, the step S18 and S20 need not exist simultaneously.

In this embodiment, the light-sensors 23 are set in parallel under the display monitor 21, and the unlocking condition 254 is matched when the light-sensors 23 are covered from left to right in order. However, the above description is just a preferred embodiment, not intended to limit the scope of the present invention.

Figure 6:
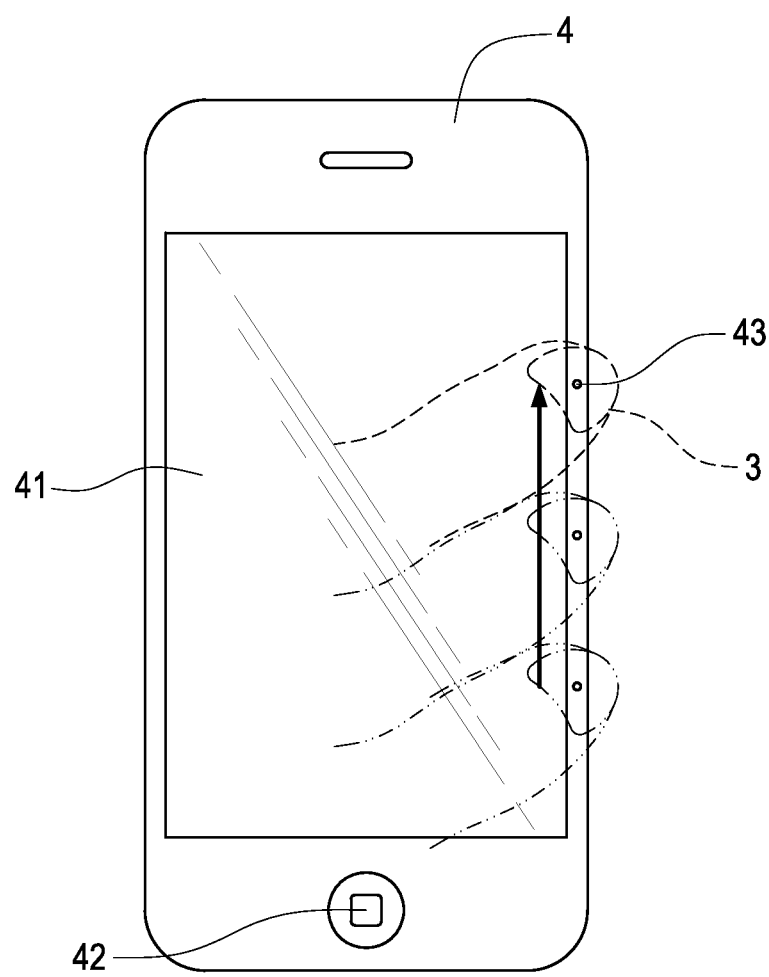
FIG. 6 is a schematic view of the unlocking action of other embodiment according to the present invention.

FIG. 6 is a schematic view of the unlocking action of other embodiment according to the present invention. FIG. 6 discloses another electronic device 4, which includes a display monitor 41, a control button 42, and a plurality of light-sensors 43. In this embodiment, the light-sensors 43 are set in vertical beside the display monitor 41, for example in FIG. 6, at the right side of the display monitor 41. However, in other embodiment, the light-sensors 43 can also set at the left side of the display monitor 41, but not limited.

As shown in FIG. 6, when the electronic device 4 works in the locking mode 251, user can activate the application program 253 and the light-sensors 42 of the electronic device 41 by pressing the control button 41, and the backlight and the instruction information 411 are displayed on the display monitor 41 simultaneously. Therefore, user can use any object, for example, user's finger 3, to perform the unlocking action on the electronic device 4 according to the instruction information 411. In particularly, the unlocking action is to cover the light-sensors 43 from detecting light source in this embodiment.

As mentioned above, if the unlocking action matches with the unlocking condition 254 stored in the electronic device 4, the electronic device 4 permits the unlocking action and is switched from the locking mode 251 to the unlocking mode 252. Therefore, user can operate the electronic device 4, and use functions provided by the electronic device 4. In this embodiment, the unlocking condition 254 is matched when the light-sensors 43 are covered in predetermined order such as from bottom to top direction, but it is also matched when the light-sensors 43 are covered in order of top to bottom direction, not intended to limit the scope of the present invention.

As the skilled person will appreciate, various changes and modifications can be made to the described embodiment. It is intended to include all such variations, modifications and equivalents which fall within the scope of the present invention, as defined in the accompanying claims.

What is claimed is:

1. An unlocking method for an electronic device, comprising:
   a) activating a plurality of light-sensors;
   b) covering the plurality of light-sensors in a predetermined order, wherein the light-sensors are determined to be covered when not detecting light source;
   c) determining whether the predetermined order of covering the light-sensors is matched with an unlocking condition or not; and
   d) switching the electronic device from a locking mode to an unlocking mode when the predetermined order is matched with the unlocking condition.

2. The unlocking method of claim 1, wherein the electronic device includes a memory therein, and the memory stores the unlocking condition, the locking mode, the unlocking mode, and an application program, and the application program determines whether the predetermined order is matched with the unlocking condition or not in step c.

3. The unlocking method of claim 2, further includes the following steps of:
   d) determining whether a covered time of covering the plurality of light-sensors is matched with the unlocking condition or not; and
   e) switching the electronic device from the locking mode to the unlocking mode when the covered time is matched with the unlocking condition.

4. The unlocking method of claim 2, further includes a step of activating an application program before step b.

5. The unlocking method of claim 4, wherein the electronic device includes a control button thereon, and the application program and the light-sensors are activated when the electronic device works in the locking mode and the control button is pressed.

6. The unlocking method of claim 4, wherein the electronic device includes a display which is not a touch screen, and a step a03 is further included before step b: displaying backlight via the display.

7. The unlocking method of claim 6, wherein a step a04 is further included before step b: displaying instruction information according to an unlocking action via the display.

8. The unlocking method of claim 6, wherein the light-sensors are set in parallel under the display, and the unlocking condition is matched when the light-sensors are covered in order of left to right direction in step c.

9. The unlocking method of claim 6, wherein the light-sensors are set in vertical and at left side of the display, and the unlocking condition is matched when the light-sensors are covered in order of bottom to top direction in step c.

10. The unlocking method of claim 6, wherein the light-sensors are set in vertical and at right side of the display, and the unlocking condition is matched when the light-sensors are covered in order of bottom to top direction in step c.

* * * * *